(12) United States Patent
Guerrero

(10) Patent No.: US 12,102,268 B2
(45) Date of Patent: Oct. 1, 2024

(54) TURNTABLE CUTTING BOARD DEVICE

(71) Applicant: Raul Guerrero, McAllen, TX (US)

(72) Inventor: Raul Guerrero, McAllen, TX (US)

( * ) Notice: Subject to any disclaimer, the term of this patent is extended or adjusted under 35 U.S.C. 154(b) by 255 days.

(21) Appl. No.: 17/867,582

(22) Filed: Jul. 18, 2022

(65) Prior Publication Data

US 2024/0016340 A1    Jan. 18, 2024

(51) Int. Cl.
*A47J 47/00* (2006.01)
*A47J 47/16* (2006.01)

(52) U.S. Cl.
CPC ............ *A47J 47/005* (2013.01); *A47J 47/16* (2013.01)

(58) Field of Classification Search
CPC ................................ A47J 47/005; A47J 47/16
See application file for complete search history.

(56) References Cited

U.S. PATENT DOCUMENTS

| | | | |
|---|---|---|---|
| 6,889,969 B2 | 5/2005 | Diermeier | |
| 6,994,336 B2 | 2/2006 | Loo | |
| 7,036,809 B1 | 5/2006 | Mitchell | |
| 7,849,789 B1 | 12/2010 | Whelan | |
| 8,985,567 B2 | 3/2015 | Contantino, Jr. | |
| 11,510,529 B2* | 11/2022 | Lankford | A47J 47/005 |
| 2006/0060052 A1* | 3/2006 | Okada | A47J 47/005 83/659 |
| 2007/0289425 A1* | 12/2007 | Chen Lin | A47J 47/005 269/309 |
| 2022/0355504 A1* | 11/2022 | Chen | B26D 7/01 |

FOREIGN PATENT DOCUMENTS

WO      WO201804158      3/2018

* cited by examiner

*Primary Examiner* — Nirvana Deonauth

(57) ABSTRACT

A turntable cutting board device for cutting food on a rotatable surface includes a base with a cutting board rotatably coupled to the base. The cutting board is planar and has a cutting surface facing away from the base and a bottom surface facing the base. A plunger is coupled to the base, faces the cutting board, and is spring biased toward the cutting board. A detent is positioned in the bottom surface of the cutting board. The detent faces the base and is positioned such that the plunger aligns with the detent when the cutting board is positioned in a locked position. The plunger removably secures the cutting board in the locked position when the cutting board is in the locked position, and the cutting board becomes unsecured from the locked position when a sufficient torque is exerted on the cutting board about the rotational axis.

12 Claims, 8 Drawing Sheets

TURNTABLE CUTTING BOARD DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to cutting boards and more particularly pertains to a new cutting board for cutting food on a rotatable surface.

(2) Description of Related Art Including Information Disclosed Under 37 CFR 1.97 and 1.98

The prior art relates to cutting boards which have unique ways of positioning. For example, one device in the prior art discloses means for removably attaching feet to the cutting board so that both sides of the cutting board can be used without resting a possibly contaminated or messy surface on a countertop while maintaining a flat surface on the other side. Another device clamps to the edge of a countertop adjacent to a sink. A third device adjusts the height of the cutting surface, and a fourth one cleans one side of the cutting board while the other one is being used for cutting food. However, the prior art does not disclose a means of rotating a cutting board to facilitate cutting food from different angles, or a drawer attached to the cutting board for collecting pieces of cut food in different sized compartments.

BRIEF SUMMARY OF THE INVENTION

An embodiment of the disclosure meets the needs presented above by generally comprising a base with a cutting board rotatably coupled to the base about a rotational axis. The cutting board is planar and has a cutting surface facing away from the base and a bottom surface facing the base. A plunger is coupled to the base, faces the cutting board, and is spring biased toward the cutting board. A detent is positioned in the bottom surface of the cutting board. The detent faces the base and is positioned such that the plunger aligns with the detent when the cutting board is positioned in a locked position. The plunger removably secures the cutting board in the locked position when the cutting board is in the locked position, and the cutting board becomes unsecured from the locked position when a sufficient torque is exerted on the cutting board about the rotational axis.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
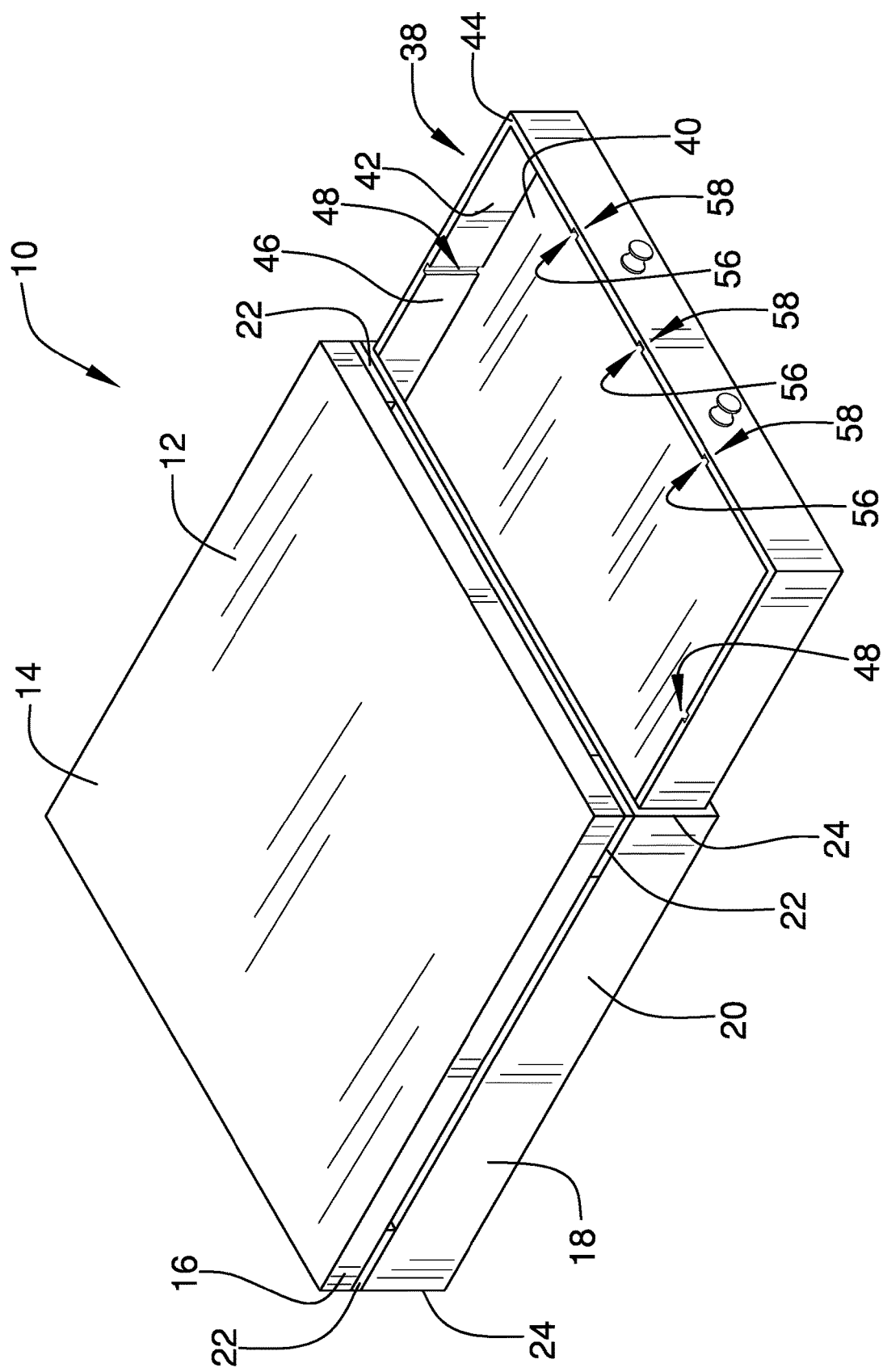
FIG. 1 is a top front side perspective view of a turntable cutting board device according to an embodiment of the disclosure with the drawer partially open and without dividers.
Figure 2:
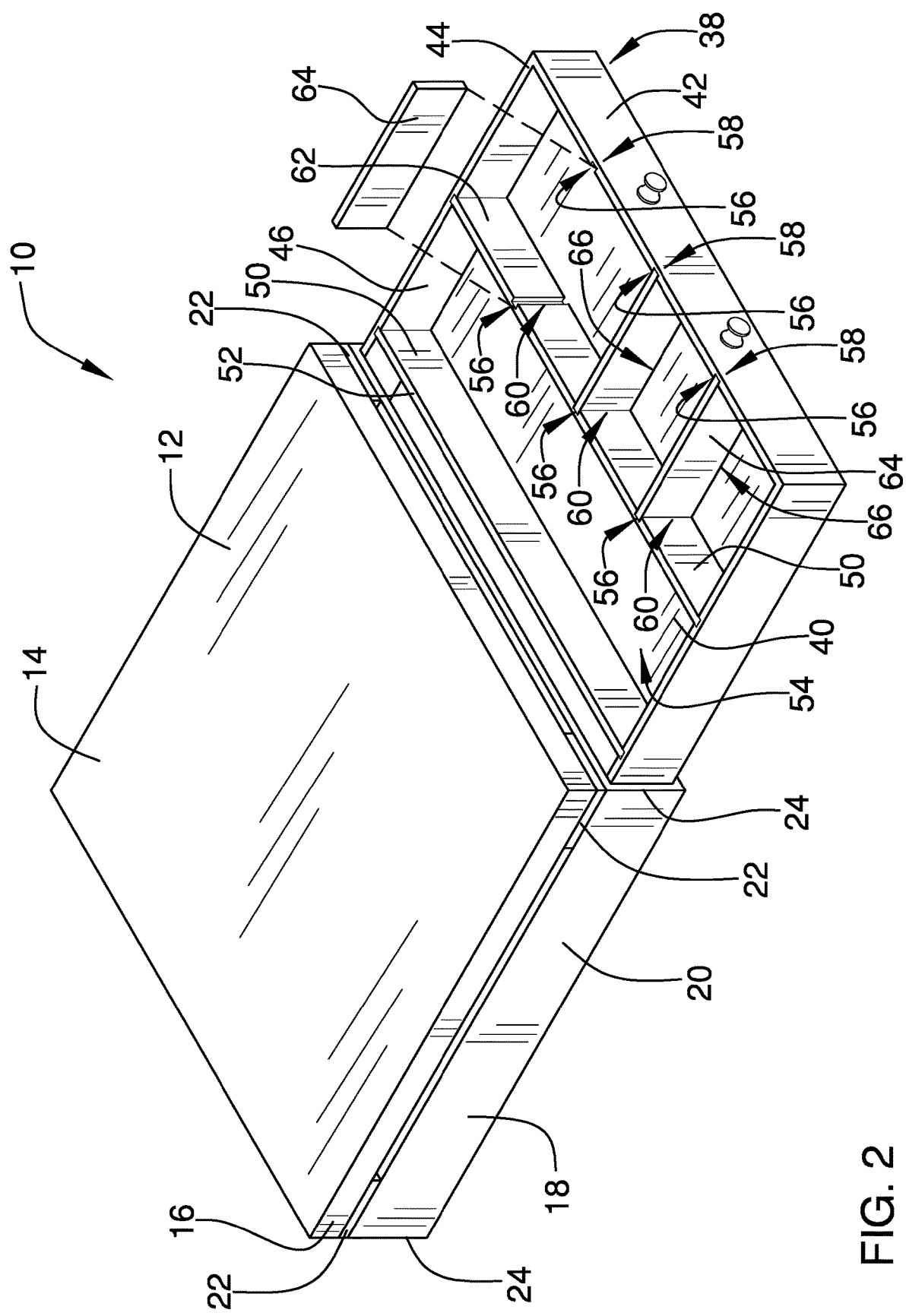
FIG. 2 is a top front side perspective view of an embodiment of the disclosure with the drawer partially open and with dividers.
Figure 3:
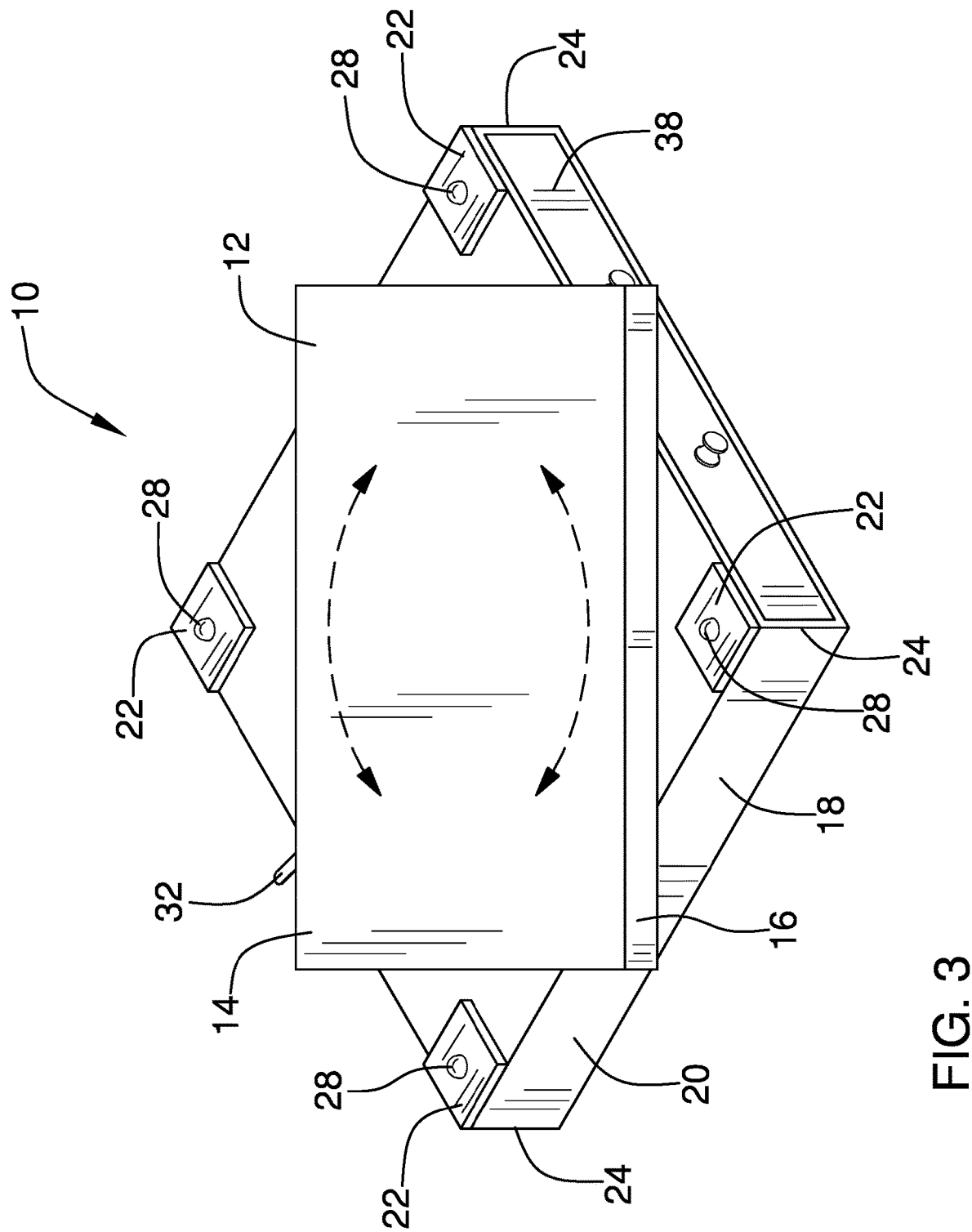
FIG. 3 is a top front side perspective view of an embodiment of the disclosure with the drawer closed and the cutting board rotated away from a locking position.
Figure 4:
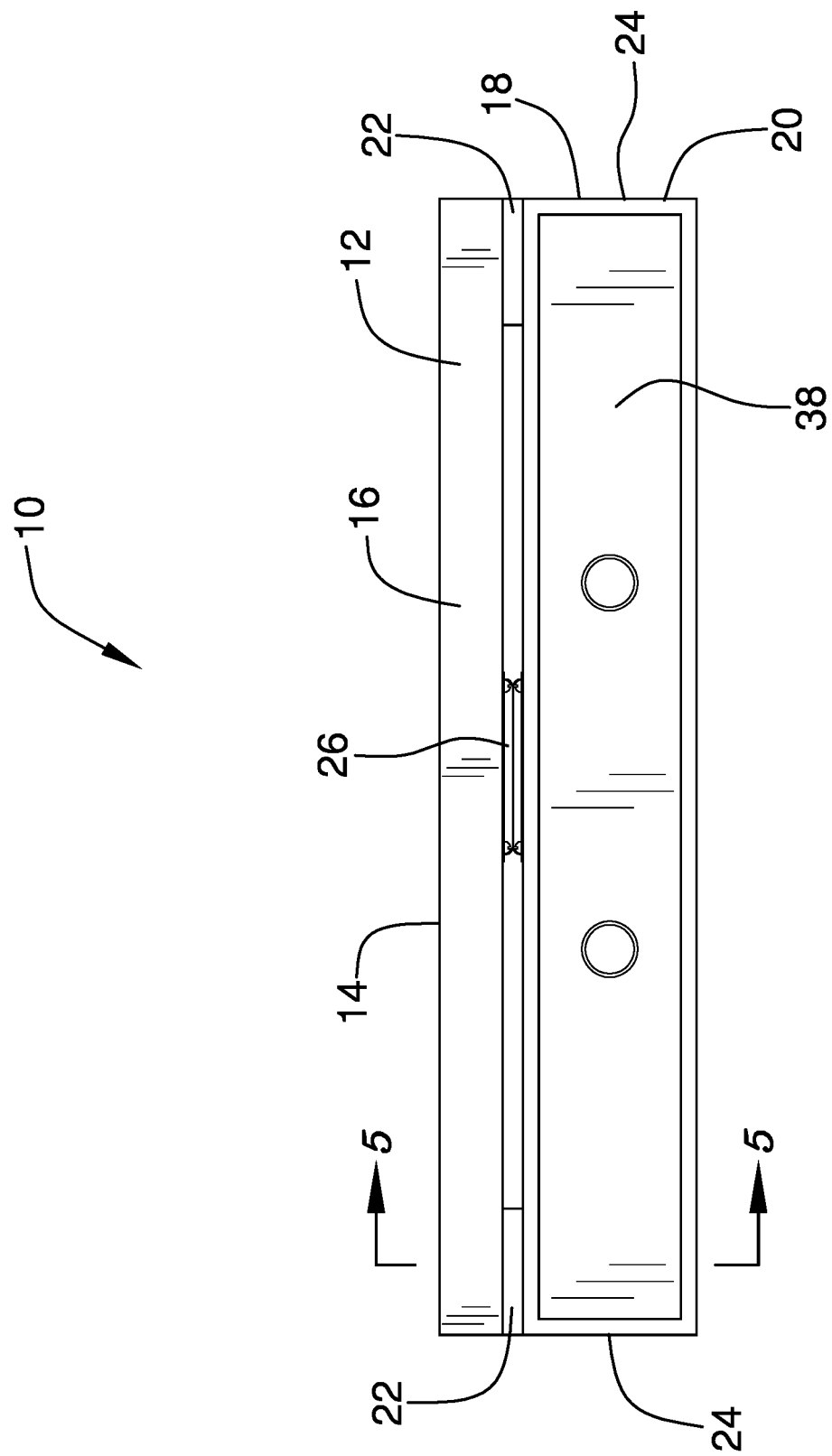
FIG. 4 is a front view of an embodiment of the disclosure.
Figure 5:
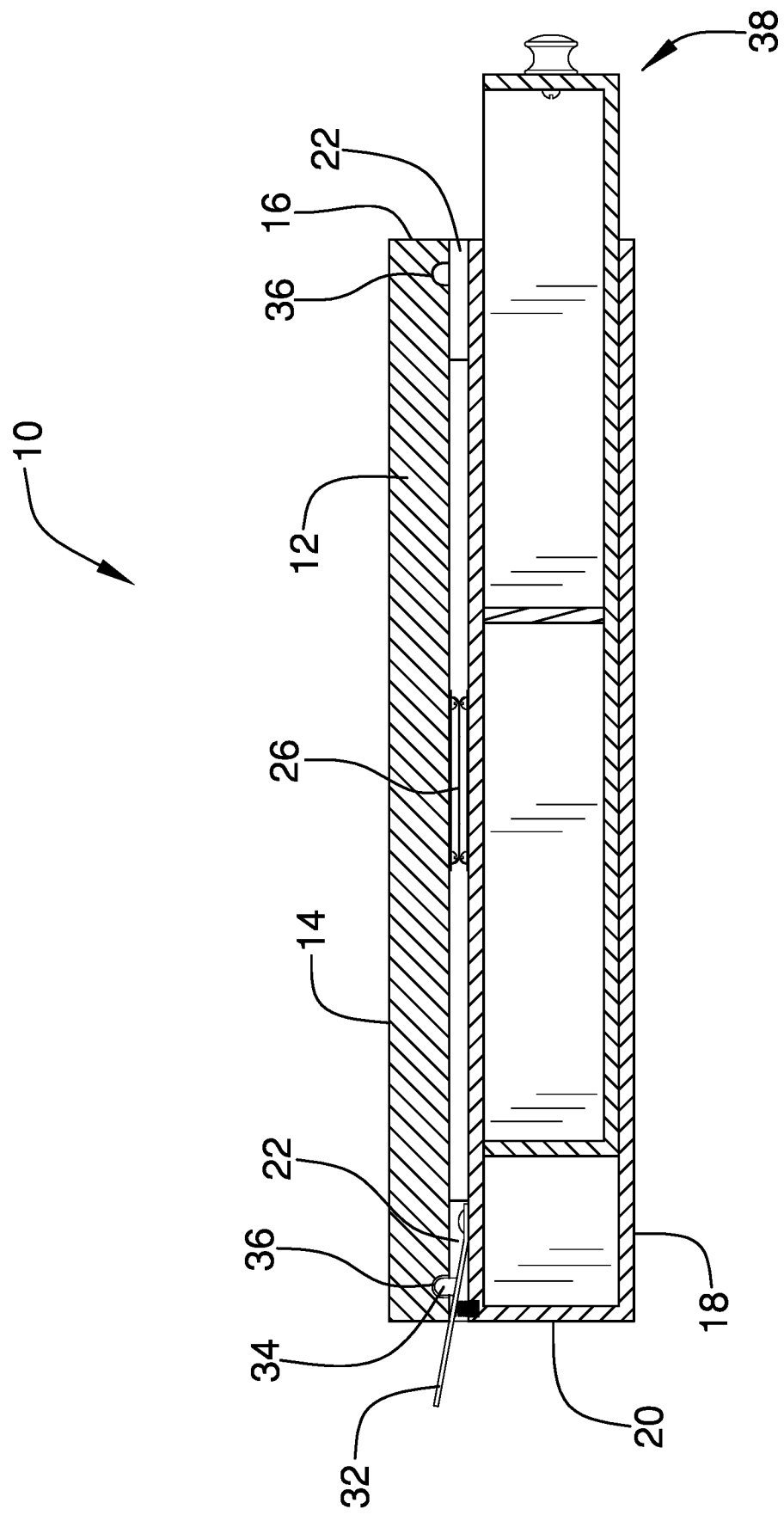
FIG. 5 is a cross-sectional view of an embodiment of the disclosure from the arrows 5-5 in FIG. 4 with the drawer partially open.
Figure 6:
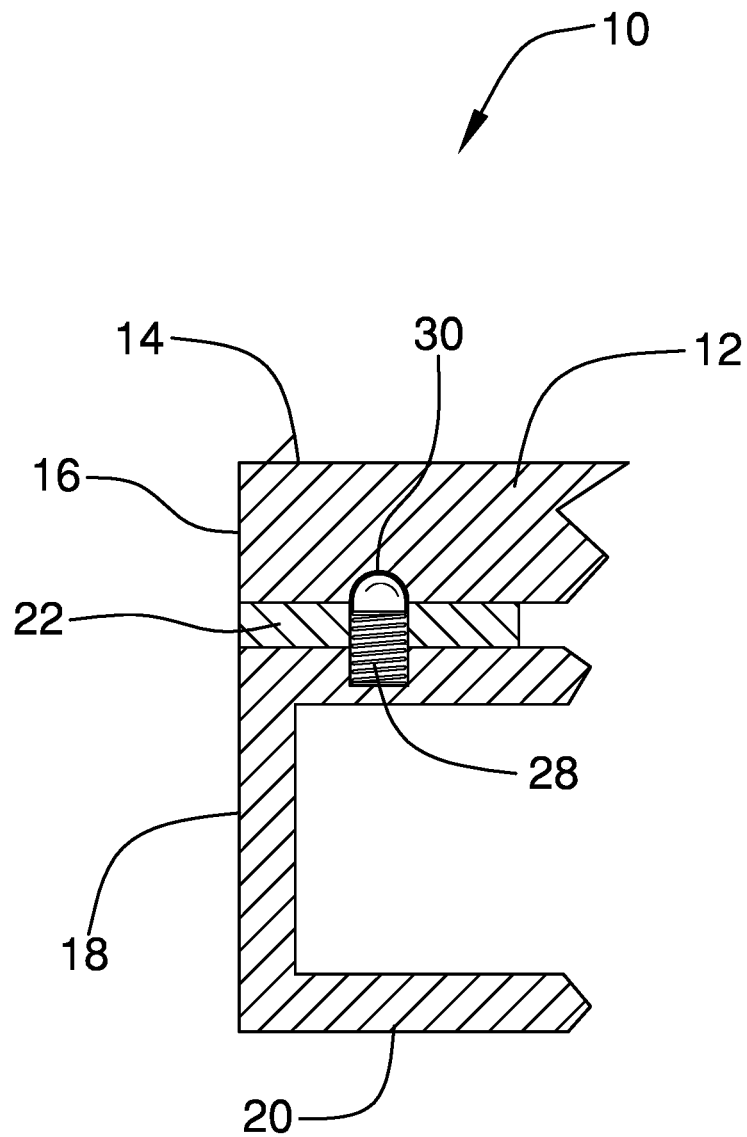
FIG. 6 is a cross-sectional detail view of a plunger-detent mechanism of an embodiment of the disclosure.
Figure 7:
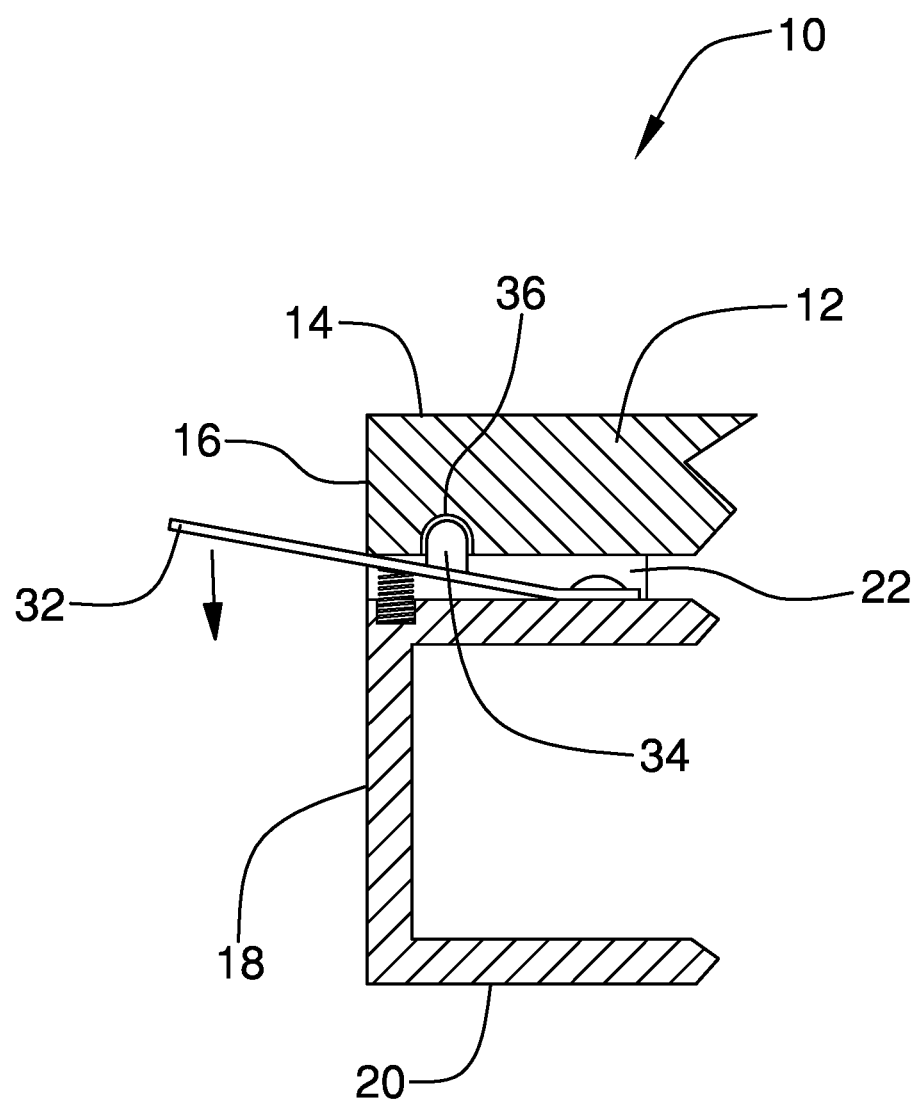
FIG. 7 is a cross-sectional detail view of the release lever of an embodiment of the disclosure.
Figure 8:
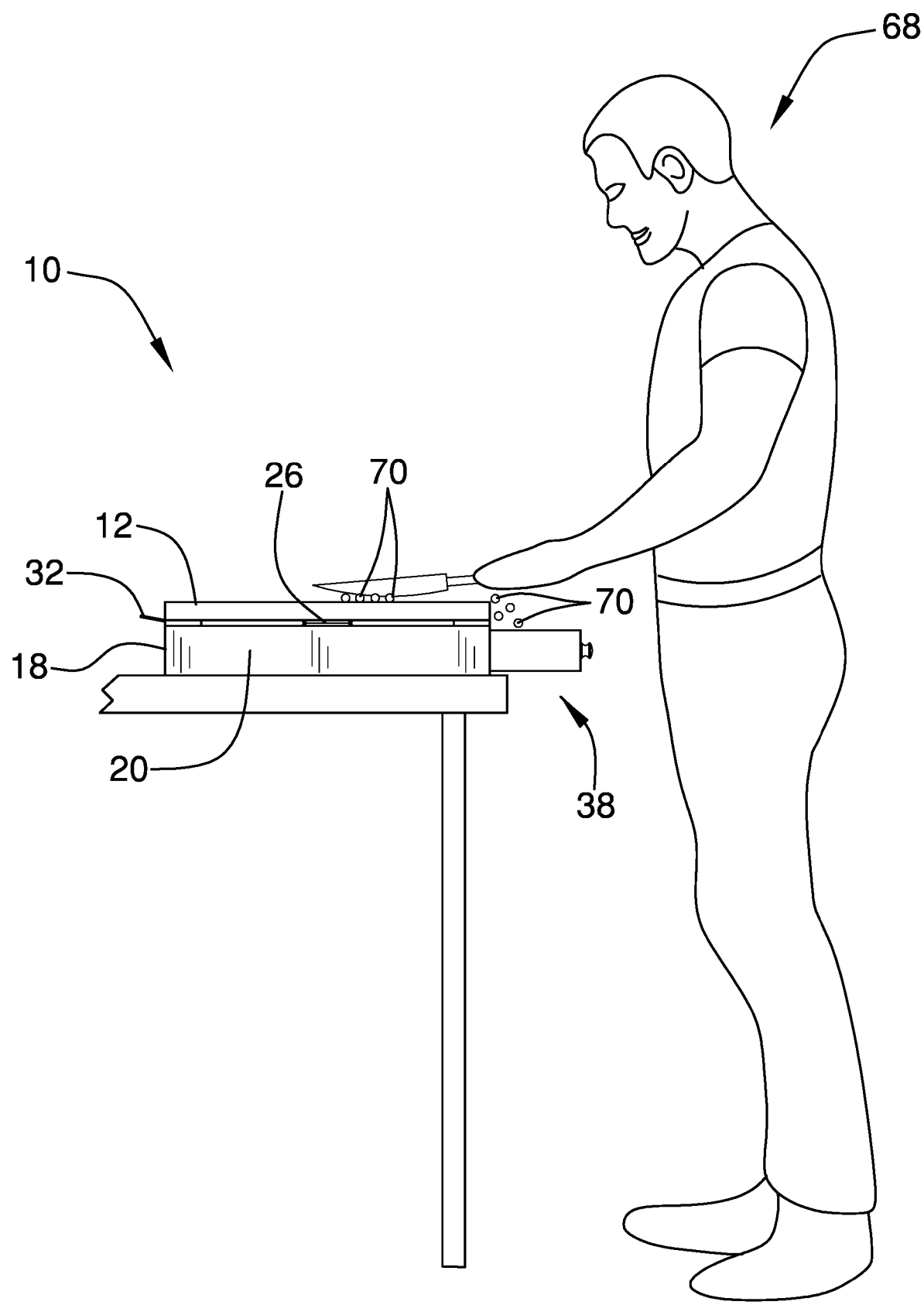
FIG. 8 is an in-use view of an embodiment of the disclosure.

With reference now to the drawings, and in particular to FIGS. 1 through 8 thereof, a new cutting board embodying the principles and concepts of an embodiment of the disclosure and generally designated by the reference numeral 10 will be described.

As best illustrated in FIGS. 1 through 8, the turntable cutting board device 10 generally comprises a planar cutting board 12 which is rotatably coupled to a base 18 and has a cutting surface 14 facing away from the base 18. The cutting board 12 also has a bottom surface 72 facing the base 18. The cutting board 12 is rotatable about a rotational axis. The base 18 comprises a main section 20 and a plurality of support pad sections 22, wherein each support pad section 22 extends between the main section 20 and the cutting board 12. The main section 20 of the base 18 has a perimeter surface which aligns with a perimeter surface 16 of the cutting board 12 when the cutting board 12 is in each of a plurality of locking positions. The perimeter surface 16 of the cutting board 12 has a square cross-section. Each support pad section 22 of the base 18 is positioned adjacent each of a plurality of corners 24 of the main section 20 of the base 18. A turntable bearing 26 rotatably couples the cutting board 12 to the base 18.

Each of a plurality of plungers 28 is coupled to an associated support pad section 22 of the base 18 and faces the cutting board 12. Each plunger 28 is spring biased toward the cutting board 12. Each of a plurality of detents 30 is positioned in the bottom surface 72 of the cutting board 12. Each detent 30 faces the base 18 and is positioned such that each plunger 28 aligns with a respective detent 30 of the plurality of detents 30 when the cutting board 12 is positioned in each locked position. The plurality of plungers 28 removably secure the cutting board 12 in each locked position when the cutting board 12 is in each locked position. The cutting board 12 becomes unsecured from each locked position when a sufficient torque is exerted on the cutting board 12 about the rotational axis. Alternatively, there may only be one plunger 28, one detent 30, and one locking position. Or only a portion of plungers 28 engage a detent 30 when securing the cutting board 12 to a locking position, or each plunger 28 engages only a portion of detents 30 when securing the cutting board 12 to a locking position. Additionally, plungers 28 may be positioned in the cutting board 12 and engage detents 30 positioned in the base 18.

A release lever 32 is coupled to the base 18 and is positioned between the base 18 and the cutting board 12 proximate a midpoint between a pair of the plurality of corners 24 of the main section 20 of the base 18. The release lever 32 extends laterally away from the base 18 and the cutting board 12. The release lever 32 also has a protrusion 34 extending toward the cutting board 12 and is spring biased toward the cutting board 12. A plurality of holes 36 is positioned in the cutting board 12 such that each hole 36 faces the base 18 and is positioned such that the protrusion 34 of the release lever 32 aligns with a respective one of the plurality of holes 36 when the cutting board 12 is positioned in each locking position. The release lever 32 removably locks the cutting board 12 when in each locked position and unlocks the cutting board 12 when the release lever 32 is moved toward the base 18, thereby removing the protrusion 34 from the respective one of the plurality of holes 36.

A drawer 38 is slidably received by an aperture in the base 18 and is slidable parallel to the cutting board 12. The drawer 38 has a bottom wall 40 and a perimeter wall 42 extending from the bottom wall 40 to a rim 44 of the perimeter wall 42. A plurality of first grooves 48 is positioned in an interior surface 46 of the perimeter wall 42 of the drawer 38 such that the plurality of first grooves 48 extends from the bottom wall 40 of the drawer 38 to the rim 44 of the perimeter wall 42 of the drawer 38, each first groove 48 facing another first groove 48. Each of a plurality of first dividers 50 is planar and is slidably positionable into an associated pair of the plurality of first grooves 48, thereby defining each of a plurality of first drawer compartments 54. A top side 52 of each first divider 50 is coplanar with the rim 44 of the perimeter wall 42 of the drawer 38.

A plurality of second grooves 56 comprises a drawer portion 58 and a divider portion 60. The drawer portion 58 is positioned in the interior surface 46 of the perimeter wall 42 of the drawer 38 and extends from the bottom wall 40 of the drawer 38 to the rim 44 of the perimeter wall 42 of the drawer 38. The divider portion 60 is positioned in a side 62 of a first divider 50 of the plurality of first dividers 50 such that each second groove 56 of the divider portion 60 of the plurality of second grooves 56 faces an associated second groove 56 of the drawer portion 58 of the plurality of second grooves 56 when the first divider 50 is positioned into the associated pair of the plurality of first grooves 48. The divider portion 60 extends from the bottom wall 40 to the top side 52 of the first divider 50 when the first divider 50 is positioned into the associated pair of the plurality of first grooves 48. Each of a plurality of second dividers 64 is planar and is slidably positionable simultaneously into an associated second groove 56 of the drawer portion 58 of the plurality of second grooves 56 and an associated second groove 56 of the divider portion 60 of the plurality of second grooves 56, thereby defining each of a plurality of second drawer compartments 66.

In use, a user 68 places a food 70 on the cutting surface 14 of the cutting board 12 when the cutting board 12 is in one of the locked positions and cuts the food 70. If the user 68 wants to turn the food 70 without repositioning it on the cutting board 12, which can be especially helpful if the food 70 sticks to the cutting board 12, the user 68 moves the release lever 32 toward the base 18, removing the protrusion 34 of the release lever 32 from the respective hole 36 of the plurality of holes 36 and unlocking the cutting board 12 from the base 18. Then the user 68 applies the sufficient torque to unsecure the plurality of plungers 28 from the plurality of detents 30 and rotates the cutting board 12 to another locking position. Each plunger 28 aligns with a respective detent 30 of the plurality of detents 30 and secures the cutting board 12 to the base 18. The user 68 releases the release lever 32, the protrusion 34 of which aligns with a respective hole 36 of the plurality of holes 36 such that the release lever 32 locks the cutting board 12 to the base 18. Then the cutting board 12 is securely locked such that it will not move when the user 68 continues cutting the food 70. The user 68 may insert and remove the first dividers 50 and second dividers 64 as desired to define the first drawer compartments 54 and the second drawer compartments 66. After cutting the food 70, the user 68 can then sweep the food 70 into one or more of the available first drawer compartments 54 and second drawer compartments 66.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A turntable cutting board device comprising:
   a base;
   a cutting board, said cutting board being rotatably coupled to said base, said cutting board being rotatable about a rotational axis, said cutting board being planar, said cutting board having a cutting surface facing away from said base, said cutting board having a bottom surface facing said base;
   a plunger, said plunger being coupled to said base and facing said cutting board, said plunger being spring biased toward said cutting board; and
   a detent, said detent being positioned in said bottom surface of said cutting board, said detent facing said base and being positioned such that said plunger aligns with said detent when said cutting board is positioned in a locked position, said plunger removably securing said cutting board in said locked position when said cutting board is in said locked position, said cutting board becoming unsecured from said locked position when a torque is exerted on said cutting board about said rotational axis.

2. The device of claim 1, wherein:
   said plunger is one of a plurality of plungers, each said plunger being coupled to said base and facing said cutting board, each said plunger being spring biased toward said cutting board; and
   said detent in said base is one of a plurality of detents in said bottom surface of said cutting board, each said detent facing said base and being positioned such that each of at least a portion of said plurality of plungers aligns with a respective detent of said plurality of detents when said cutting board is positioned in each of a plurality of locked positions of the locked position, said at least a portion of said plurality of plungers removably securing said cutting board in each said locked position when said cutting board is in each said locked position, said cutting board becoming unsecured from each said locked position when the torque is exerted on said cutting board about said rotational axis.

3. The device of claim 1, wherein:
   said plunger is one of a plurality of plungers, each said plunger being coupled to said base and facing said cutting board, each said plunger being spring biased toward said cutting board; and
   said detent in said base is one of a plurality of detents in said bottom surface of said cutting board, each said detent facing said base and being positioned such that each of at least a portion of said plurality of plungers aligns with a respective detent of said plurality of detents when said cutting board is positioned in each of a plurality of locked positions, said at least a portion of said plurality of plungers removably securing said cutting board in each said locked position when said cutting board is in each said locked position, said cutting board becoming unsecured from each said locked position when the sufficient torque is exerted on said cutting board about said rotational axis.

4. The device of claim 3, further comprising:
   a release lever, said release lever being coupled to said base, said release lever being positioned between said base and said cutting board, said release lever extending laterally away from said base and said cutting board, said release lever having a protrusion extending toward said cutting board, said release lever being spring biased toward said cutting board; and
   a plurality of holes, said plurality of holes being positioned in said cutting board, each said hole facing said base and being positioned such that said protrusion of said release lever aligns with a respective one of said plurality of holes when said cutting board is positioned in each said locking position, said release lever removably locking said cutting board when in each said locked position, said release lever unlocking said cutting board when said lever is moved toward said base, thereby removing said protrusion from said respective one of said plurality of holes.

5. The device of claim 3, wherein said plurality of detents in said bottom surface of said cutting board is positioned such that each said plunger aligns with a respective detent of said plurality of detents when said cutting board is positioned in each of said locking positions, said plurality of plungers removably securing said cutting board in each said locked position when said cutting board is in each said locked position, said cutting board becoming unsecured from each said locked position when the torque is exerted on said cutting board about said rotational axis.

6. The device of claim 1 further comprising:
   a release lever, said release lever being coupled to said base, said release lever being positioned between said base and said cutting board, said release lever extending laterally away from said base and said cutting board, said release lever having a protrusion extending toward said cutting board, said release lever being spring biased toward said cutting board; and
   a plurality of holes, said plurality of holes being positioned in said cutting board, each said hole facing said base and being positioned such that said protrusion of said release lever aligns with a respective one of said plurality of holes when said cutting board is positioned in each said locking position, said release lever removably locking said cutting board when in each said locked position, said release lever unlocking said cutting board when said lever is moved toward said base, thereby removing said protrusion from said respective one of said plurality of holes.

7. The device of claim 3, wherein said base comprises a main section and a plurality of support pad sections, each said support pad section extending between said main section and said cutting board, each said plunger being positioned in an associated one of said plurality of support pad sections.

8. The device of claim 7, wherein said main section of said base has a perimeter surface, said cutting board having a perimeter surface which aligns with the perimeter surface of said main section of said base when said cutting board is in each said locking position, said perimeter surface of said cutting board having a square cross-section, each said support pad section of said base being positioned adjacent each of a plurality of corners of said main section of said base, said release lever being positioned proximate a midpoint between a pair of said plurality of corners of said main section.

9. The device of claim 1, further comprising a drawer, said drawer being slidably received by an aperture in said base, said drawer being slidable parallel to said cutting board, wherein said drawer has a bottom wall and a perimeter wall extending from said bottom wall to a rim of said perimeter wall.

10. The device of claim 9, further comprising:
    a plurality of first grooves, said plurality of grooves being positioned in an interior surface of said perimeter wall of said drawer, said plurality of grooves extending from said bottom wall of said drawer to said rim of said perimeter wall of said drawer, each said first groove facing another of each said first groove; and a plurality of first dividers, each said first divider being planar, each said first divider being slidably positionable into an associated pair of said plurality of first grooves, thereby defining each of a plurality of first drawer compartments, a top side of each said first divider being coplanar with said rim of said perimeter wall of said drawer.

11. The device of claim 9, further comprising:

a plurality of second grooves, said plurality of second grooves comprising a drawer portion and a divider portion, said drawer portion being positioned in said interior surface of said perimeter wall of said drawer, said drawer portion extending from said bottom wall of said drawer to said rim of said perimeter wall of said drawer, said divider portion being positioned in a side of a first divider of said plurality of first dividers such that each said second groove of said divider portion of said plurality of second grooves faces an associated second groove of said drawer portion of said plurality of second grooves when said first divider is positioned into said associated pair of said plurality of first grooves, said divider portion extending from said bottom wall to said top side of said first divider when said first divider is positioned into said associated pair of said plurality of first grooves; and a plurality of second dividers, each said second divider being planar, each said second divider being slidably positionable simultaneously into an associated second groove of said drawer portion of said plurality of second grooves and an associated second groove of said divider portion of said plurality of second grooves, thereby defining each of a plurality of second drawer compartments.

12. A turntable cutting board device comprising:

a cutting board, said cutting board being planar, said cutting board having a cutting surface;

a base, wherein said base comprises a main section and a plurality of support pad sections, each said support pad section extending between said main section and said cutting board, wherein said cutting board is rotatably coupled to said base, said cutting surface of said cutting board facing away from said base, said cutting board being rotatable about a rotational axis, wherein said cutting board has a bottom surface facing said base, wherein said main section of said base has a perimeter surface, said cutting board having a perimeter surface which aligns with the perimeter surface of said main section of said base when said cutting board is in each of a plurality of locking positions, said perimeter surface of said cutting board having a square cross-section, each said support pad section of said base being positioned adjacent each of a plurality of corners of said main section of said base;

a turntable bearing, said turntable bearing rotatably coupling said cutting board to said base;

a plurality of plungers, each said plunger being coupled to an associated support pad section of said base and facing said cutting board, each said plunger being spring biased toward said cutting board;

a plurality of detents, each said detent being positioned in said bottom surface of said cutting board, each said detent facing said base and being positioned such that each plunger aligns with a respective detent of said plurality of detents when said cutting board is positioned in each said locked position, said plurality of plungers removably securing said cutting board in each said locked position when said cutting board is in each said locked position, said cutting board becoming unsecured from each said locked position when a torque is exerted on said cutting board about said rotational axis;

a release lever, said release lever being coupled to said base, said release lever being positioned between said base and said cutting board, said release lever extending laterally away from said base and said cutting board, said release lever having a protrusion extending toward said cutting board, said release lever being spring biased toward said cutting board, said release lever being positioned proximate a midpoint between a pair of said plurality of corners of said main section;

a plurality of holes, said plurality of holes being positioned in said cutting board, each said hole facing said base and being positioned such that said protrusion of said release lever aligns with a respective one of said plurality of holes when said cutting board is positioned in each said locking position, said release lever removably locking said cutting board when in each said locked position, said release lever unlocking said cutting board when said lever is moved toward said base, thereby removing said protrusion from said respective one of said plurality of holes;

a drawer, said drawer being slidably received by an aperture in said base, said drawer being slidable parallel to said cutting board, wherein said drawer has a bottom wall and a perimeter wall extending from said bottom wall to a rim of said perimeter wall;

a plurality of first grooves, said plurality of grooves being positioned in an interior surface of said perimeter wall of said drawer, said plurality of grooves extending from said bottom wall of said drawer to said rim of said perimeter wall of said drawer, each said first groove facing another of each said first groove;

a plurality of first dividers, each said first divider being planar, each said first divider being slidably positionable into an associated pair of said plurality of first grooves, thereby defining each of a plurality of first drawer compartments, a top side of each said first divider being coplanar with said rim of said perimeter wall of said drawer;

a plurality of second grooves, said plurality of second grooves comprising a drawer portion and a divider portion, said drawer portion being positioned in said interior surface of said perimeter wall of said drawer, said drawer portion extending from said bottom wall of said drawer to said rim of said perimeter wall of said drawer, said divider portion being positioned in a side of a first divider of said plurality of first dividers such that each said second groove of said divider portion of said plurality of second grooves faces an associated second groove of said drawer portion of said plurality of second grooves when said first divider is positioned into said associated pair of said plurality of first grooves, said divider portion extending from said bottom wall to said top side of said first divider when said first divider is positioned into said associated pair of said plurality of first grooves; and a plurality of second dividers, each said second divider being planar, each said second divider being slidably positionable simultaneously into an associated second groove of said drawer portion of said plurality of second grooves and an associated second groove of said divider portion of said plurality of second grooves, thereby defining each of a plurality of second drawer compartments.

\* \* \* \* \*